No. 689,875. Patented Dec. 31, 1901.
L. HAHNE.
REVERSING GEAR FOR COMPOUND STEAM ENGINES.
(Application filed May 4, 1901.)
(No Model.) 6 Sheets—Sheet 1.
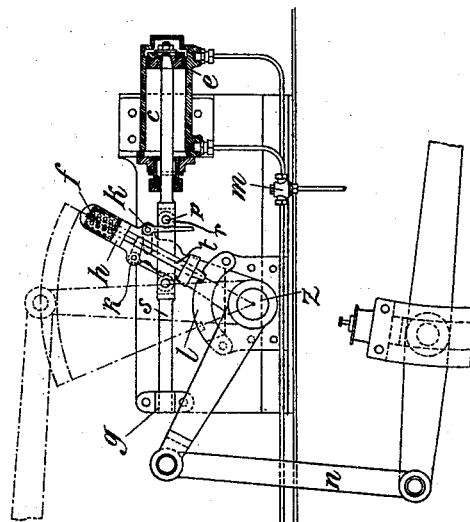
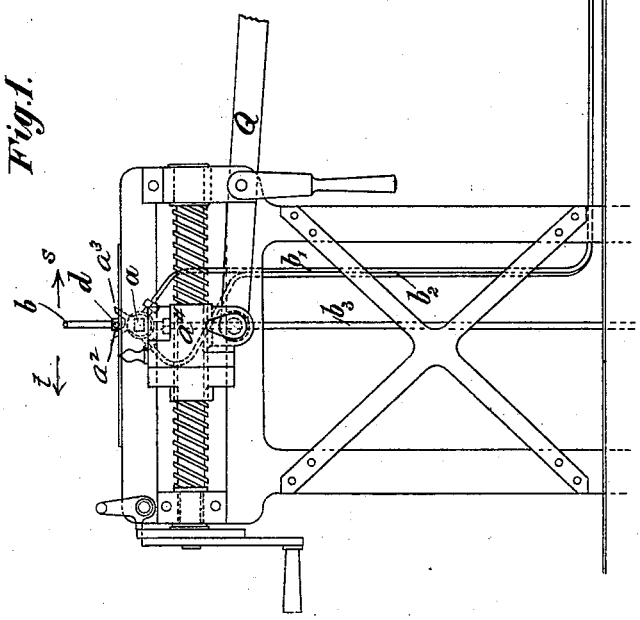
Witnesses:
Edward Ray
William Schulz
Inventor:
Louis Hahne
by his attorneys
Roeder & Briesen No. 689,875. Patented Dec. 31, 1901.
L. HAHNE.
REVERSING GEAR FOR COMPOUND STEAM ENGINES.
(Application filed May 4, 1901.)
(No Model.) 6 Sheets—Sheet 2.
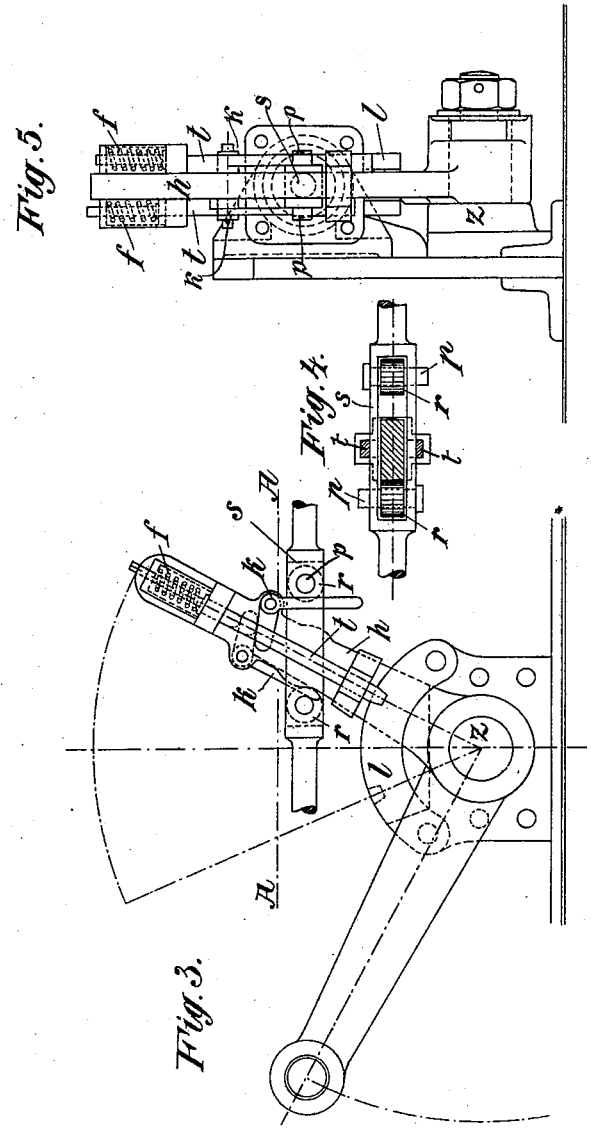
Witnesses:
Edward Ray
William Schulz
Inventor:
Louis Hahne
by his attorneys
Roeder & Briesen

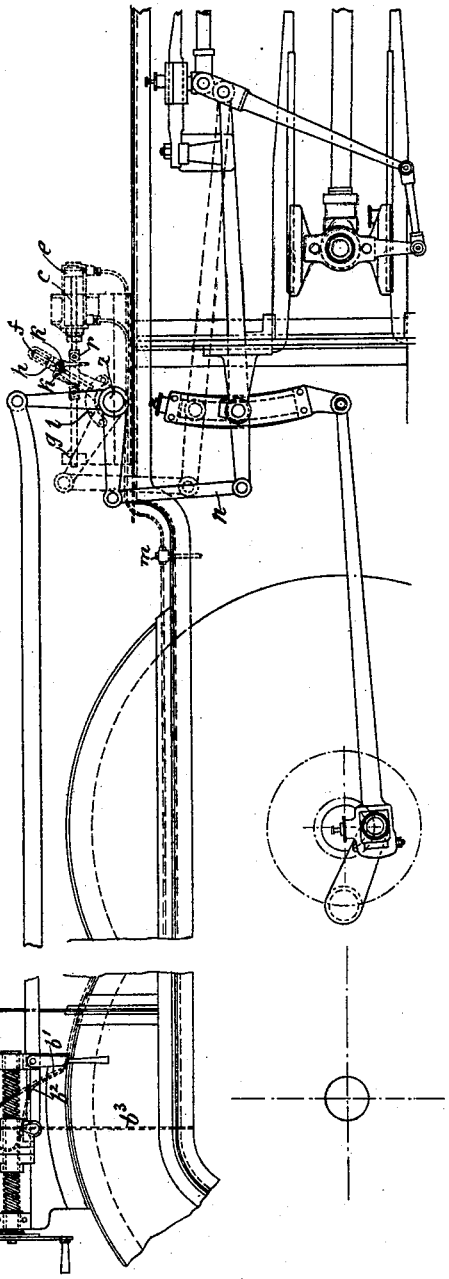

No. 689,875. Patented Dec. 31, 1901.
L. HAHNE.
REVERSING GEAR FOR COMPOUND STEAM ENGINES.
(Application filed May 4, 1901.)
(No Model.) 6 Sheets—Sheet 4.
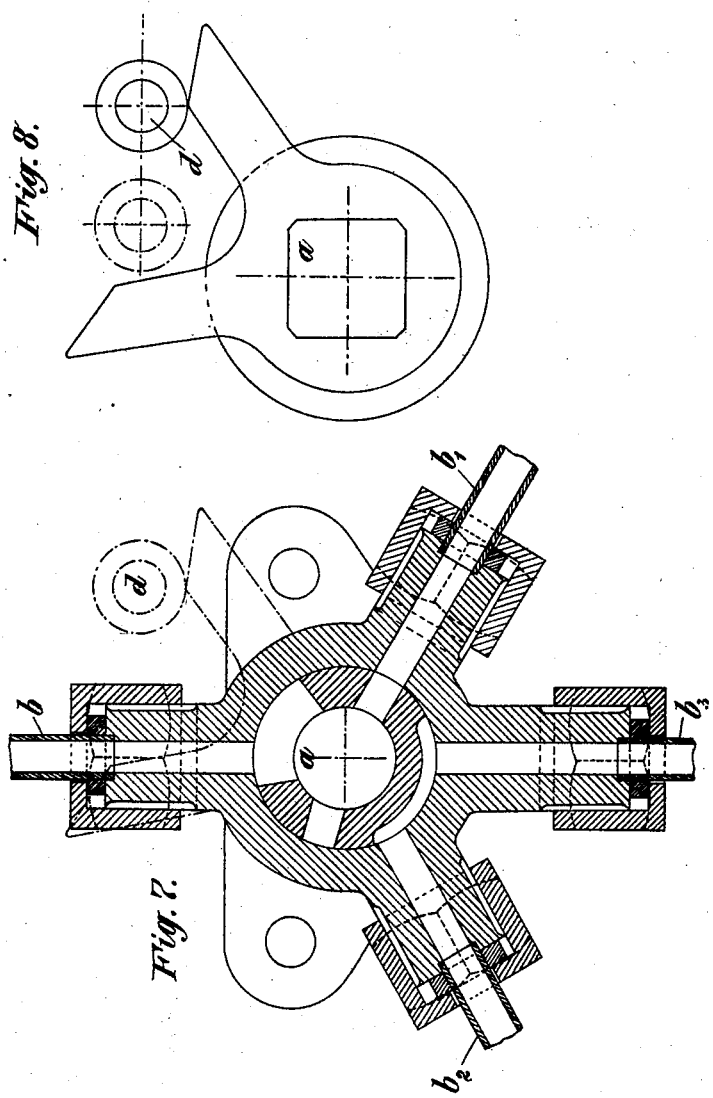
Witnesses:
Edward Ray.
William Schulz
Inventor:
Louis Hahne
by his attorneys
Roeder & Briesen No. 689,875. Patented Dec. 31, 1901.
L. HAHNE.
REVERSING GEAR FOR COMPOUND STEAM ENGINES.
(Application filed May 4, 1901.)
(No Model.) 6 Sheets—Sheet 5.
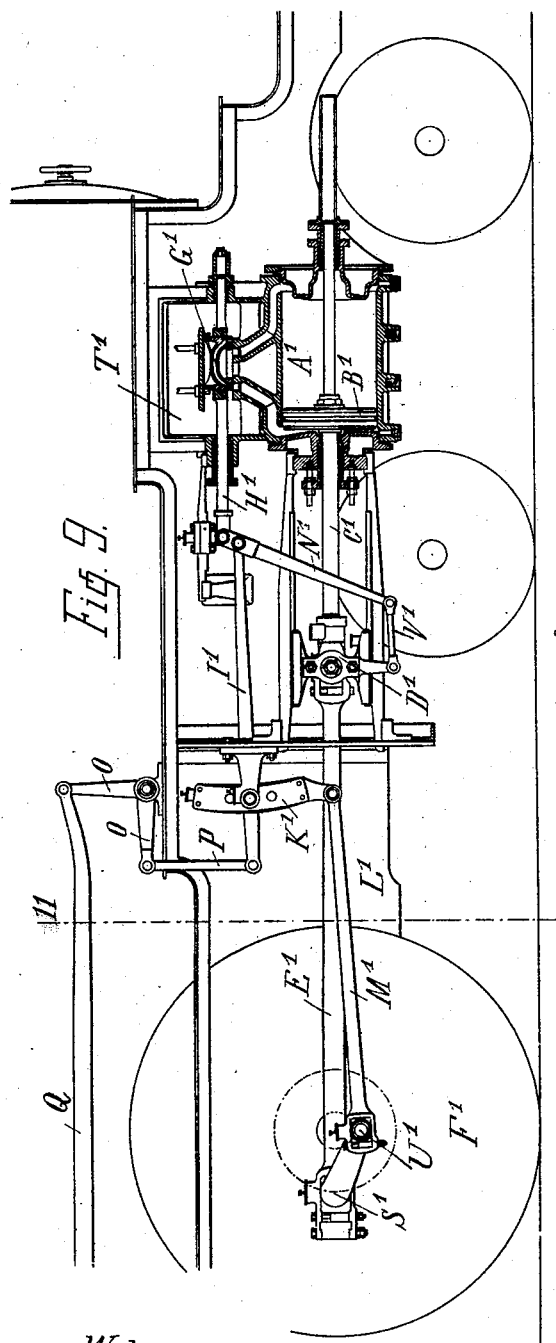
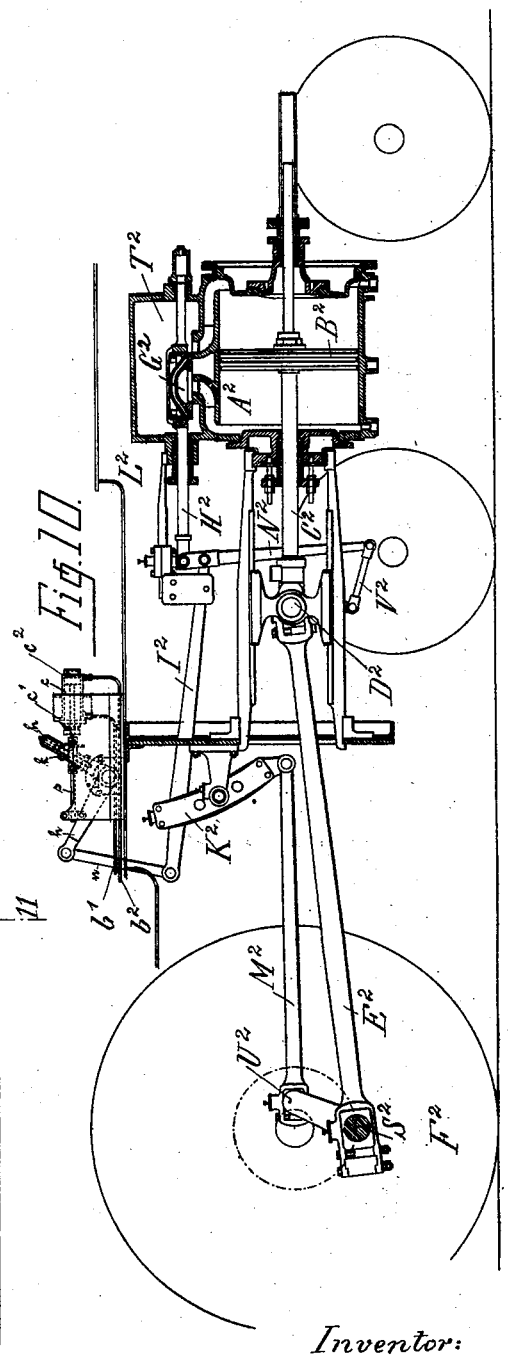
Witnesses:
Arthur Lumpe
William Schulz
Inventor:
Louis Hahne
by his attorneys
Roeder & Briesen No. 689,875. Patented Dec. 31, 1901.
L. HAHNE.
REVERSING GEAR FOR COMPOUND STEAM ENGINES.
(Application filed May 4, 1901.)
(No Model.) 6 Sheets—Sheet 6.
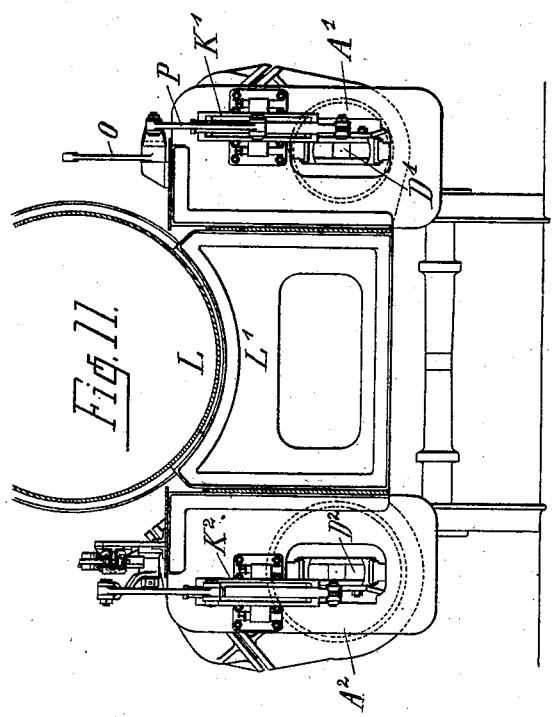
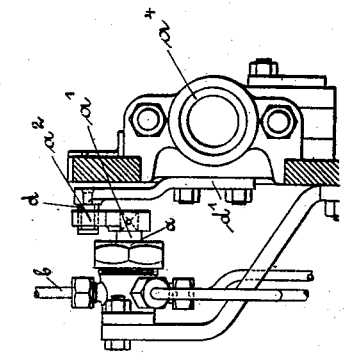
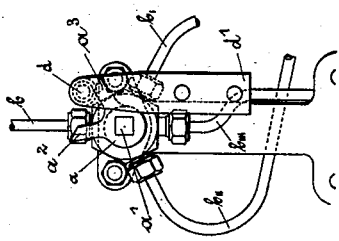
Witnesses:
Arthur Lumpe
William Schulz
Inventor:
Louis Hahne
by his attorneys
Roeder & Briesen

UNITED STATES PATENT OFFICE.

LOUIS HAHNE, OF CASSEL, GERMANY.

REVERSING-GEAR FOR COMPOUND STEAM-ENGINES.

SPECIFICATION forming part of Letters Patent No. 689,875, dated December 31, 1901.

Application filed May 4, 1901. Serial No. 58,714. (No model.)

*To all whom it may concern:*

Be it known that I, LOUIS HAHNE, a subject of the King of Prussia, Emperor of Germany, residing at Cassel, in the Kingdom of Prussia, Germany, have invented certain new and useful Improvements in Reversing-Gears for Compound Steam-Engines, of which the following is a specification.

In order with compound engines to be able to make the low-pressure cylinder work with the same degree of filling whether running forward or backward and at every degree of cut-off in the high-pressure cylinder, the valve-gear of the low-pressure cylinder must be in so far independent of that of the high-pressure cylinder that when reversing the engine at whatever degree of cut-off for the high-pressure cylinder, the low-pressure-cylinder valve-gear must always allow of the same degree of filling. This was heretofore effected by causing the driver to actuate the valve-gear of each cylinder directly, both being mounted on one and the same counter-shaft. According to the present invention such counter-shaft common to both valve-gears is done away with, the valve-gears of the two cylinders being entirely separate and that of the low-pressure cylinder being actuated automatically by the piston of a fluid-pressure cylinder, the starting of which is controlled by the hand-lever of the valve-gear of the high-pressure cylinder.

I will describe the said invention with reference to the accompanying drawings, in which—

Figure 1 shows a side view of the reversing-gear; Fig. 2, a side view of the mechanism for actuating the valve-gear of the low-pressure cylinder; Fig. 3, the same view to an enlarged scale; Fig. 4, a section on line A A, Fig. 3; Fig. 5, a front view of the mechanism; Fig. 6, a general side view of the whole apparatus; Fig. 7, a section through the four-way cock for the pressure-fluid supply for the auxiliary cylinder; Fig. 8, the reversing device for the four-way-cock plug. Fig. 9 is a vertical section through the high-pressure cylinder of a locomotive, showing its valve-gear; Fig. 10, a vertical section through the low-pressure cylinder, showing its valve-gear; Fig. 11, a cross-section on line 11 11, Fig. 9; Fig. 12, a side elevation of the four-way cock $a$, and Fig. 13 a front elevation of the same.

In applying my invention to a locomotive L a high-pressure cylinder $A'$ and a low-pressure cylinder $A^2$ are provided and secured to the frame $L'$ of the locomotive L in any of the usual manners. These cylinders are provided with the pistons $B'$ $B^2$, having piston-rods $C'$ $C^2$, which transfer their motion by the cross-heads $D'$ $D^2$ and the pitmen $E'$ $E^2$ to the crank-pins $S'$ $S^2$ of the driving-wheels $F'$ $F^2$ of the locomotive. To control the admission and exhaust of the steam to and from the cylinders, slide-valves $G'$ $G^2$ are provided and mounted in the usual steam-chests $T'$ $T^2$. These slide-valves $G'$ $G^2$, having the valve-rods $H'$ $H^2$, are moved to and fro by means of any of the well-known types of reversing-gearings used for compound locomotives. In the accompanying drawings I have illustrated the gearing type of Heusinger von Waldegg. The valve-rods $H'$ $H^2$ receive motion from crank-pins $U'$ $U^2$ by connecting-rods $M'$ $M^2$, connecting-links $K'$ $K^2$, and connecting-rods $I'$ $I^2$, on one hand, and from the cross-heads $D'$ $D^2$ by connecting-rods $V'$ $V^2$ and levers $N'$ $N^2$, on the other hand.

To reverse the engine or to change the degree of filling of the high-pressure cylinder, the angle-lever O is provided, which, entirely independent of the gearing of the low-pressure cylinder, is moved in the usual manner from the cab by a connecting-rod Q, and thus transfers its motion by rod P to the connecting-rod $I'$, and thereby to the slide-valve $G'$. To the center of the frame of the said reversing-gear in the cab is fixed a four-way cock $a$, which is connected by a pipe $b$ with a reservoir of pressure fluid. This cock is connected by pipes $b'$ $b^2$ with the two ends of an auxiliary cylinder $c$, mounted outside the cab, while pipe $b^3$ connects cock $a$ with the open air. The plug $a'$ of the cock $a$, having the necessary lateral ports, is provided with two arms $a^2$ $a^3$. To the screw-nut $a^4$ of the reversing-gear spindle or to the hand-lever is secured an arm $d'$, having a pin $d$. The pin $d$, when moving with the screw-nut in the direction of arrow $s$, pushes down arm $a^3$, and thereby turns the plug $a'$ into one end position, while if the pin $d$ moves with the screw-nut in direction of arrow $t$ it pushes down arm $a^2$, and thereby turns the plug $a'$ in the other end position. If the arm $a^3$ is pushed down, communication is established between the fluid-pressure reservoir and the end $c'$ of cylinder $c$ by pipes $b\ b'$, while the end $c^2$ communicates by pipes $b^2\ b^3$ with the open air. If the arm $a^3$ is pushed down by the opposite motion of pin $d$, communication is established between the fluid-pressure reservoir and the end $c^2$ of the cylinder $c$ by pipes $b\ b^2$, while the end $c'$ communicates by pipes $b'\ b^3$ with the open air.

The air-pressure or steam admitted to the cylinder $c$ acts upon the piston $e$, whose slotted piston-rod $s$, guided at $g$, embraces the elbow-lever $h$. With this is connected a rod $n$, which serves to raise and lower the slide-valve rod in the usual link-motion. The lever $h$ is journaled at $z$ and works between two guides $l$, which are provided with a notch at each end for the engagement of the spring-catch $t\ t$ on the lever $h$ for holding the latter securely in its end positions. For raising the catches $t\ t$ out of engagement there are provided on the lever $h$ two small pivoted elbow-levers $k\ k$, whose short arms are engaged in slots in the catches $t\ t$, which are pressed downward by springs $f\ f$. Against the levers $k$ bear the projecting ends of the pins $p$ of the rollers $r$, situated in the slot of the piston-rod $s$, for actuating the reversing-lever $h$. The pipes $b'$ and $b^2$ are provided with drain-cocks $m$ at their deepest points for discharging water of condensation when steam is used as the pressure fluid.

By the above construction the valve-gear of the low-pressure cylinder $A^2$ in effecting the forward or backward motion of the locomotive is always arrested in one of its end positions. In this way the low-pressure cylinder always works with the most advantageous degree of filling independent from the degree of filling of the high-pressure cylinder. If the direction of motion of the locomotive is to be changed and the angle-lever O of the high valve-gear $A'$, and therewith the screw-nut $a^4$, is moved for this purpose over its middle position, the cock $a$ is turned by the above-described arrangement of the pin $d$, and in this way communication between the fluid-pressure reservoir and one end of cylinder $c$ is established, and therefore the piston $e$ is pushed to the other end of the cylinder, even though the nut $a^4$ is moved only a little over its middle position. Thus the slide-valve of the low-pressure cylinder is fully opened independent of the opening of the slide-valve of the high-pressure cylinder.

The action of the above-described apparatus is as follows: When the screw-nut of the reversing-gear spindle or the driver's handle is moved forward in direction of arrow $s$ for bringing the valve-gear of the high-pressure cylinder into position for forward motion in the usual manner, the carrier-pin $d$, by passing the middle of the frame, takes along the arm $a^3$ of the plug $a'$ and turns it into its one end position. In this way communication is established between the fluid-pressure reservoir and the end $c'$ of the auxiliary cylinder $c$ by pipes $b\ b'$, while the end $c^2$ of said cylinder communicates with the open air by pipes $b^2\ b^3$. The fluid-pressure entering end $c'$ of the cylinder and pressing on piston $e$ forces the latter forward, the fluid on the other side of piston $e$ at the same time escaping to the open air. At the commencement of the forward motion of the piston-rod $s$ the pin $p$ of roller $r$ bears against the elbow-lever $k$, causing this to raise catch $t$ out of engagement with its notch, whereupon the roller $r$ in bearing against the lever $h$ throws this over into its extreme forward position, thus setting the valve-gear of the low-pressure cylinder for effecting the complete filling of the latter. The parts are held in this position by the engagement of the catches $t$ in the other notches of the guides. At the same time by means of the screw spindle and nut the valve-gear of the high-pressure cylinder can be adjusted to any desired degree of cut-off. On the reversal of the motion of the screw spindle and nut the valve-gear of the low-pressure cylinder is actuated in the same manner as above described in the opposite direction.

Having thus described my invention, I claim as new and desire to secure by Letters Patent—

1. In a reversing-gear for compound steam-engines, the combination of high and low pressure cylinders, steam-chests, and valves with an auxiliary piston adapted to be set by the reversing-gear of the high-pressure cylinder, a reversing-lever actuated by said piston, and with means for connecting said lever to the valve-gear of the low-pressure cylinder, substantially as specified.

2. In a reversing-gear for compound steam-engines, the combination of high and low pressure cylinders, steam-chests, and valves with an auxiliary piston adapted to be set by the reversing-gear of the high-pressure cylinder, a reversing-lever actuated by said piston, spring-catches on the lever, means on the piston-rod for operating said catches, a notched guide adapted to be engaged by the catches, and means for connecting the reversing-lever to the valve-gear of the low-pressure cylinder, substantially as specified.

3. In a reversing-gear for compound steam-engines, the combination of high and low pressure cylinders, steam-chests, and valves with a cock adapted to be set by the reversing-gear of the high-pressure cylinder, a pressure reservoir and pipes, an auxiliary cylinder communicating therewith, a piston within said cylinder, a reversing-lever actuated by said piston, and means for connecting said lever to the valve-gear of the low-pressure cylinder, substantially as specified.

In witness whereof I have hereunto signed my name in the presence of two subscribing witnesses.

LOUIS HAHNE.

Witnesses:
HEINRICH GRAU,
OTTO LEIDEMANN.